(12) United States Patent
Salciccioli et al.

(10) Patent No.: US 12,169,986 B2
(45) Date of Patent: Dec. 17, 2024

(54) VEHICLE DATA STORAGE ACTIVATION

(71) Applicant: Ford Global Technologies, LLC, Dearborn, MI (US)

(72) Inventors: Nicolas Salciccioli, Birmingham, MI (US); David Michael Herman, West Bloomfield, MI (US); Yashanshu Jain, Dearborn, MI (US); Aaron L. Mills, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 17/723,849

(22) Filed: Apr. 19, 2022

(65) Prior Publication Data
US 2023/0334914 A1   Oct. 19, 2023

(51) Int. Cl.
*G07C 5/00*     (2006.01)
*G06N 7/01*     (2023.01)

(52) U.S. Cl.
CPC ............... *G07C 5/008* (2013.01); *G06N 7/01* (2023.01)

(58) Field of Classification Search
CPC ........ G07C 5/008; G07C 5/0841; G06N 7/01; G06N 20/00; G06F 17/18; G06F 17/40; G06F 18/22
See application file for complete search history.

(56) References Cited

U.S. PATENT DOCUMENTS

| | | |
|---|---|---|
| 8,131,419 B2 | 3/2012 | Ampunan et al. |
| 11,113,292 B2 | 9/2021 | Mori et al. |
| 2015/0066834 A1* | 3/2015 | Jeffries ............ H03M 7/70 707/752 |
| 2016/0303968 A1* | 10/2016 | Miller ............ B60K 35/00 |
| 2019/0197038 A1* | 6/2019 | Mori ............ G06N 7/01 |
| 2023/0097749 A1* | 3/2023 | Hashimoto ........ G01C 21/3885 701/450 |

FOREIGN PATENT DOCUMENTS

| | | |
|---|---|---|
| CN | 110335370 A | 10/2019 |
| CN | 112380317 B | 4/2021 |

OTHER PUBLICATIONS

Harmouch, "17 types of similarity and dissimilarity measures used in data science", Mar. 13, 2021, https://towardsdatascience.com/17-types-of-similarity-and-dissimilarity-measures-used-in-data-science-3eb914d2681.

* cited by examiner

*Primary Examiner* — Dale W Hilgendorf
*Assistant Examiner* — Frank T Glenn, III
(74) *Attorney, Agent, or Firm* — Christopher Storms; Bejin Bieneman PLC

(57) ABSTRACT

A computer is programmed to receive a plurality of first values for a respective plurality of variables transmitted over a communications network of a vehicle; determine a similarity measure between the first values and a plurality of second values of the variables; determine whether to transmit a collection of data transmitted over the communications network based on the similarity measure; and, upon so determining, transmit the collection of data to a server remote from the vehicle. The second values are a most similar set of values from an activation surface for a feature of the vehicle. The activation surface is a surface in a space defined by the variables dividing the space into regions in which activation of the feature is more or less likely than not, respectively, to have occurred when the variables have values in that region.

19 Claims, 4 Drawing Sheets

VEHICLE DATA STORAGE ACTIVATION

BACKGROUND

Modern vehicles typically include a plurality of sensors that generate data. The sensors can provide data about the operation of the vehicle, for example, wheel speed, wheel orientation, steering angle, steering-wheel angle, steering-column torque, gear shifting, accelerator-pedal position, brake-pedal position, brake-pad application force, and engine and transmission data (e.g., temperature, fuel consumption, etc.). For example, the sensors can include torque sensors, position sensors, temperature sensors, etc. The sensors can detect the location and/or orientation of the vehicle. For example, the sensors can include global positioning system (GPS) sensors; accelerometers such as piezoelectric or microelectromechanical systems (MEMS); gyroscopes such as rate, ring laser, or fiber-optic gyroscopes; inertial measurements units (IMU); and magnetometers. The sensors can detect the external world, e.g., objects and/or characteristics of surroundings of the vehicle, such as other vehicles, road lane markings, traffic lights and/or signs, pedestrians, etc. For example, the sensors can include radar sensors, scanning laser range finders, light detection and ranging (LIDAR) devices, and image processing sensors such as cameras.

DETAILED DESCRIPTION

Figure 1:
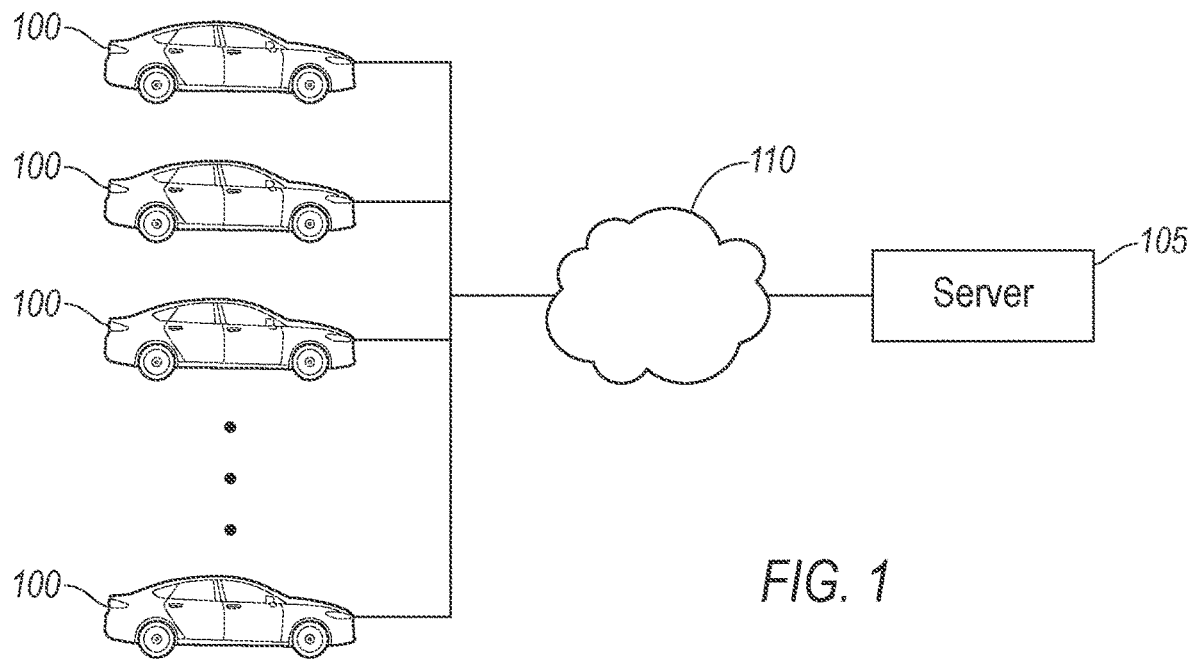
FIG. 1 is a block diagram of a plurality of vehicles in communication with a computer.

Systems and methods described herein provide an efficient way to collect, communicate, and store vehicle data in certain situations in which a feature of the vehicle may or may not have activated. The feature can be, e.g., forward collision warning, lane-departure warning, blind-spot warning, automatic emergency braking, adaptive cruise control, speech recognition, or lane-keeping assistance. Vehicle data can include data about performance of the feature. Vehicles can generate large quantities of data, and collecting, including communicating and storing, all of that data may be impractical and/or technically infeasible because of limitations in available memory and/or computer network bandwidth, for example. Vehicle data gathered during unlikely or infrequent situations can provide otherwise unavailable or difficult-to-obtain information about the performance of the vehicle.

To collect and store the vehicle data about the feature, the system described herein can include a computer programmed to receive a plurality of first values for a respective plurality of variables transmitted over a communications network of the vehicle. The variables can define a space, e.g., an n-dimensional space for n different variables. A set of one value for each variable defines a point in the space. An activation surface, e.g., stored in the memory of the computer, can divide the space into a first region and a second region. When the variables have values in the first region, activation of the feature is more likely than not to have occurred. When the variables have values in the second region, activation of the feature is less likely than not to have occurred. For example, the activation surface can be deterministic, i.e., activation of the feature occurs when the variables have values in the first region and does not occur when the variables have values in the second region. Next, the computer can determine a similarity measure between the first values and a most similar set of values from the activation surface, referred to herein as second values. For example, the similarity measure can be a distance through the n-dimensional space from the point containing the first values to the closest point on the activation surface. The computer can then determine whether to transmit a collection of data based on the similarity measure and, upon so determining, transmit the collection of data to a server remote from the vehicle. The vehicles can therefore be more likely to send data from situations in which the feature is close to the borderline of activation.

A computer includes a processor and a memory, and the memory stores instructions executable by the processor to receive a plurality of first values for a respective plurality of variables transmitted over a communications network of a vehicle; determine a similarity measure between the first values and a plurality of second values of the variables; determine whether to transmit a collection of data based on the similarity measure; and, upon determining to transmit the collection of data, transmit the collection of data to a server remote from the vehicle. The second values are a most similar set of values from an activation surface for a feature of the vehicle. The activation surface is a surface in a space defined by the variables dividing the space into a first region and a second region. Activation of the feature has occurred more likely than not when the variables have values in the first region, and activation of the feature is less likely to have occurred than not when the variables have values in the second region. The collection of data is data transmitted over the communications network.

A likelihood of determining to transmit the collection of data may be positively correlated with the similarity measure.

The instructions may further include instructions to receive the activation surface from the server.

The instructions may further include instructions to determine a probability value of the variables equaling the first values, and determining whether to transmit the collection of data may be based on the probability value. Determining the probability value may be based on a probability distribution of the variables. The instructions may further include instructions to receive the probability distribution of the variables from the server.

A likelihood of determining to transmit the collection of data may be negatively correlated with the probability value.

The instructions may further include instructions to determine a sum including the similarity measure and the probability value, determining whether to transmit the collection of data may include determining whether the sum exceeds a threshold, and transmitting the collection of data to the server may occur upon determining that the sum exceeds the threshold. The sum may be a weighted sum including the similarity measure and the probability value weighted by respective weights. The instructions may further include instructions to receive the weights from the server.

The probability value may be a first probability value, the instructions may further include instructions to receive a plurality of third values for a respective plurality of secondary variables and determine a second probability value of the secondary variables equaling the third values, the secondary variables may be not used for activating the feature, and the sum may include the similarity measure, the first probability value, and the second probability value.

The instructions may further include instructions to receive a plurality of third values for a respective plurality of secondary variables and determine a probability value of the secondary variables equaling the third values, the secondary variables may be not used for activating the feature, and determining whether to transmit the collection of data may be based on the probability value. Determining the probability value may be based on a probability distribution of the secondary variables. The instructions may further include instructions to receive the probability distribution of the secondary variables from the server.

A likelihood of determining to transmit the collection of data may be negatively correlated with the probability value.

The collection of data may include data indicating whether the feature activated during an interval of time.

The collection of data may include a plurality of third values of the variables over an interval of time, and the third values include the first values.

Activation of the feature may include actuation of at least one of a propulsion system, a braking system, or a steering system of the vehicle.

The feature may be one of forward collision warning, lane-departure warning, blind-spot warning, automatic emergency braking, adaptive cruise control, or lane-keeping assistance.

A method includes receiving a plurality of first values for a respective plurality of variables transmitted over a communications network of a vehicle; determining a similarity measure between the first values and a plurality of second values of the variables; determining whether to transmit a collection of data based on the similarity measure; and, upon determining to transmit the collection of data, transmitting the collection of data to a server remote from the vehicle. The second values are a most similar set of values from an activation surface for a feature of the vehicle. The activation surface is a surface in a space defined by the variables dividing the space into a first region and a second region. Activation of the feature has occurred more likely than not when the variables have values in the first region, and activation of the feature is less likely to have occurred than not when the variables have values in the second region. The collection of data is data transmitted over the communications network.

With reference to the Figures, wherein like numerals indicate like parts throughout the several views, a computer 200 includes a processor and a memory, and the memory stores instructions executable by the processor to receive a plurality of first values 300 for a respective plurality of variables transmitted over a communications network 205 of a vehicle 100; determine a similarity measure between the first values 300 and a plurality of second values 305 of the variables; determine whether to transmit a collection of data based on the similarity measure; and, upon determining to transmit the collection of data, transmit the collection of data to a server 105 remote from the vehicle 100. The second values 305 are a most similar set of values from an activation surface 310 for a feature of the vehicle 100. The activation surface 310 is a surface in a space 315 defined by the variables dividing the space 315 into a first region 320 and a second region 325. Activation of the feature has occurred more likely than not when the variables have values in the first region 320, and activation of the feature is less likely to have occurred than not when the variables have values in the second region 325. The collection of data is data transmitted over the communications network 205.

With reference to FIG. 1, the server 105 may communicate with a plurality of the vehicles 100. The vehicles 100 may each be any passenger or commercial automobile such as a car, a truck, a sport utility vehicle, a crossover, a van, a minivan, a taxi, a bus, a jeepney, etc.

The vehicles 100 can communicate with the server 105 over a network 110. The network 110 represents one or more mechanisms by which the server 105 may communicate with remote entities. Accordingly, the network 110 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 105 is a microprocessor-based computing device, e.g., a generic computing device including a processor and a memory. The memory of the server 105 can include media for storing instructions executable by the processor as well as for electronically storing data and/or databases. The server 105 can be multiple computers coupled together.

Figure 2:
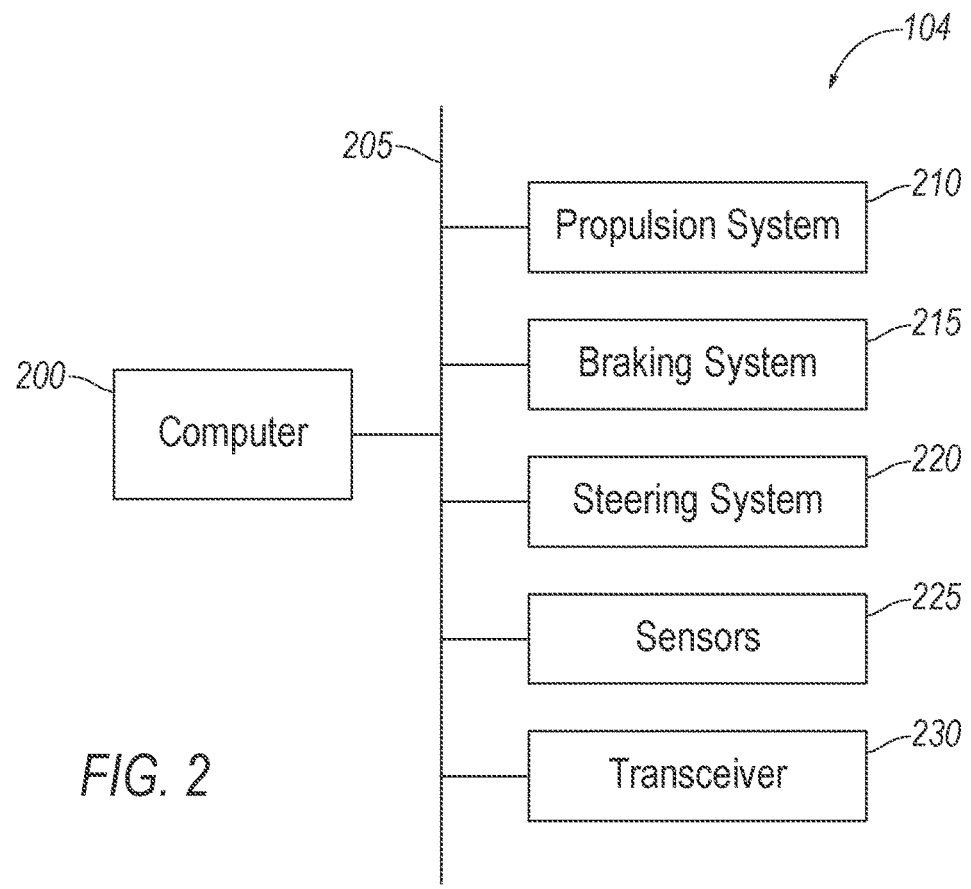
FIG. 2 is a block diagram of one of the vehicles.

With reference to FIG. 2, each vehicle 100 can include a respective computer 200. The computer 200 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 200 can thus include a processor, a memory, etc. The memory of the computer 200 can include media for storing instructions executable by the processor as well as for electronically storing data and/or databases, and/or the computer 200 can include structures such as the foregoing by which programming is provided. The computer 200 can be multiple computers coupled together on board the vehicle 100.

The computer 200 may transmit and receive data on board the vehicle 100 through the communications network 205. The communications network 205 can be a controller area network (CAN) bus, Ethernet, WiFi, Local Interconnect Network (LIN), onboard diagnostics connector (OBD-II), and/or by any other wired or wireless communications network. The computer 200 may be communicatively coupled to a propulsion system 210, a braking system 215, a steering system 220, sensors 225, a transceiver 230, and other components via the communications network 205.

The propulsion system 210 of the vehicle 100 generates energy and translates the energy into motion of the vehicle 100. The propulsion system 210 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 210 can include an electronic control unit (ECU) or the like that is in communication with and receives input from the computer 200 and/or a human operator. The human operator may control the propulsion system 210 via, e.g., an accelerator pedal and/or a gear-shift lever.

The braking system 215 is typically a conventional vehicle braking subsystem and resists the motion of the vehicle 100 to thereby slow and/or stop the vehicle 100. The braking system 215 may include friction brakes such as disc brakes, drum brakes, band brakes, etc.; regenerative brakes; any other suitable type of brakes; or a combination. The braking system 215 can include an electronic control unit (ECU) or the like that is in communication with and receives input from the computer 200 and/or a human operator. The human operator may control the braking system 215 via, e.g., a brake pedal.

The steering system 220 is typically a conventional vehicle steering subsystem and controls the turning of the wheels. The steering system 220 may be a rack-and-pinion system with electric power-assisted steering, a steer-by-wire system, as both are known, or any other suitable system. The steering system 220 can include an electronic control unit (ECU) or the like that is in communication with and receives input from the computer 200 and/or a human operator. The human operator may control the steering system 220 via, e.g., a steering wheel.

The sensors 225 may provide data about operation of the vehicle 100, for example, wheel speed, wheel orientation, and engine and transmission data (e.g., temperature, fuel consumption, etc.). The sensors 225 may detect the location and/or orientation of the vehicle 100. For example, the sensors 225 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 225 may detect the external world, e.g., objects and/or characteristics of surroundings of the vehicle 100, such as other vehicles, road lane markings, traffic lights and/or signs, pedestrians, etc. For example, the sensors 225 may include radar sensors, ultrasonic sensors, scanning laser range finders, light detection and ranging (LIDAR) devices, and image processing sensors such as cameras. Sensor predictions and outputs may be stored on the computer 200 as unstructured data, structured data, or some form in between.

The transceiver 230 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 230 may be adapted to communicate with a remote entity, that is, an entity distinct and spaced from the vehicle 100, via the network 110. The remote entity may be located outside the vehicle 100. For example, the remote entity may be the server 105. For another example, the remote entity may be associated with another vehicle (e.g., V2V communications), an infrastructure component (e.g., V2I communications), an emergency responder, a mobile device associated with the owner of the vehicle 100, etc. The transceiver 230 may be one device or may include a separate transmitter and receiver.

The vehicle 100 can include one or more features. The features can be advanced driver assistance systems (ADAS). For example, the feature can be one of forward collision warning, lane-departure warning, or blind-spot warning. The features can be semi-autonomous features, and activating the feature can include actuating at least one of the propulsion system 210, the braking system 215, or the steering system 220. For example, the feature can be one of automatic emergency braking, adaptive cruise control, or lane-keeping assistance. The features can be any other system or device on board the vehicle 102 that activates without intervention by an operator, e.g., speech recognition, antilock braking, temperature-activated climate control, Bluetooth® detection of a mobile device, etc.

The computer 200 can store a program, i.e., a set of program instructions executable by a processor of the computer 200, for deciding whether to activate the feature. The computer 200 can use the program to make the decisions about whether to activate the feature. For example, the program can set out criteria for activating the feature, e.g., criteria based on data from the sensors 225 and/or from the vehicle systems 210, 215, 220. The computer 200 can activate the feature in response to the data satisfying the criteria. For example, if the feature is a lane-departure warning or lane-keeping assistance, the criteria can be that camera data indicates that the vehicle 100 is less than a threshold distance from a lane boundary. The criteria can use a subset of the variables, meaning that at least one variable, e.g., several of the variables, are not used to decide whether to activate the feature. The decisions about activating the feature can include decisions to activate the feature and decisions to refrain from activating the feature.

The computer 200 can store a collection of data to a rolling buffer as described below. The collection of data can include any data transmitted over the communications network 205, e.g., from the propulsion system 210, the braking system 215, the steering system 220, and the sensors 225. The collection of data can include the decisions about activating the feature, e.g., whether the feature activated during an interval of time. For example, the decisions can be represented as a binary variable, e.g., taking values of 1 for activated and 0 for unactivated, over a time series. The collection of data can include the first values 300 of a plurality of variables. For the purposes of this disclosure, a "variable" is, as understood in the computer arts, a datum or set of data that is able to take on multiple values; a variable can be transmitted over the communications network 205. Variables can be raw data, e.g., distance ranges from ultrasonic sensors, or RPMs of an engine of the propulsion system 210, or the variables can be calculated from other data, e.g., a predicted time to impact with another vehicle in front of the vehicle 100. The variables can be explicitly or implicitly treated as deterministic or probabilistic. For example, a variable can be treated as probabilistic with uncertainty according to, e.g., known noise for the sensor 225 measuring the variable. The data can include structured data and unstructured data. Structured data is data that is organized in a standardized format. For example, data that is sent through a CAN bus that may be included in the communications network 205 is typically in the Database Container (.dbc) file format, which is a type of structured data. Some sensors 225, such as cameras, can produce unstructured data.

The computer 200 can be programmed to store the collection of data transmitted over the communications network 205, e.g., from the propulsion system 210, the braking system 215, the steering system 220, and the sensors 225, in the rolling buffer. The rolling buffer can be a portion of the memory of the computer 200. The rolling buffer can store the data for a set period of time, e.g., five seconds; in other words, at any given time, the rolling buffer contains the data generated on board the vehicle 100 in the last five seconds. As new data is generated and stored in the rolling buffer, the oldest data in the rolling buffer is overwritten (a rolling buffer is sometimes also referred to as a ring buffer or a circular buffer). The computer 200 can be programmed to, in response to a trigger, store the data contained in the rolling buffer in memory indefinitely, i.e., so that the copy stored in the memory is not overwritten.

Figure 3:
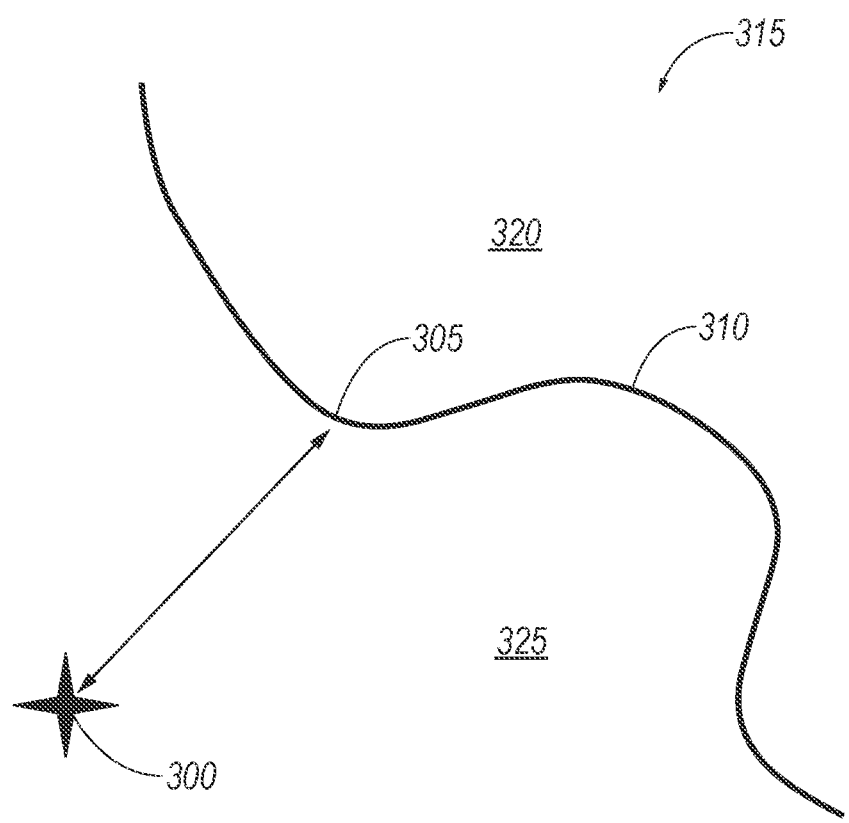
FIG. 3 is a plot of an example activation surface of a feature of the vehicle.

With reference to FIG. 3, the variables define the space 315. For example, for n different variables, the space 315 can be an n-dimensional space 315 with one axis for each variable. Each point in the space 315 is a set of one value for each variable, which can be represented as a vector. Thus, the first values 300 are a point, and the second values 305 are a point. FIG. 3 shows a simplified version of the space 315 with two variables, but the number of variables can be much greater than two. The variables chosen for the space 315 can be the variables used in the criteria for activating the feature, either used directly or part of a decomposition of variables used directly. The variables can be scaled or normalized for the space 315. For example, each axis defining the space 315 can measure a variable scaled to a range from zero to one, e.g., $$x_{i,sc} = \frac{x_i - x_{i,min}}{x_{i,max} - x_{i,min}}$$

in which x refers to the variables, the subscript i is an index of the variables ranging from 1 to the number of variables n, the subscript sc indicates that the value is scaled, the subscript min refers to the smallest value that variable can take, and the subscript max refers to the largest value that variable can take.

The activation surface 310 is a surface in the space 315 that divides the space 315 into the first region 320 and the second region 325. For the two-dimensional space 315 shown in FIG. 3, the activation surface 310 is a curve. The first region 320 is where activation of the feature is more likely than not to have occurred, i.e., has a probability of activation greater than 50%. The second region 325 is where activation of the feature is less likely than not to have occurred, i.e., has a probability less than 50%. For example, the activation surface 310, first region 320, and second region 325 can be probabilistic, i.e., the probability of activation for at least a portion of the first region 320 is less than 100% and/or the probability of activation for at least a portion of the second region 325 is greater than 0%. Alternatively, the activation surface 310, first region 320, and second region 325 can be deterministic, i.e., activation of the feature occurs when the variables have values in the first region 320 (i.e., the probability of activation is 100%) and activation of the feature does not occur when the variables have values in the second region 325 (i.e., the probability of activation is 0%). If the feature has multiple possible outputs when activated, the second region 325 can be divided into subregions corresponding to the possible outputs, e.g., when the feature is lane-keeping assistance, the second region 325 can include subregions for steering left and for steering right. The activation surface 310, the first region 320, and the second region 325 can be mutually exclusive and exhaustive of the space 315; in other words, every point in the space 315 is one, and only one, of on the activation surface 310, in the first region 320, or in the second region 325.

The server 105 can be programmed to determine the activation surface 310, the first region 320, and the second region 325. For example, the server 105 can determine the activation surface 310, the first region 320, and the second region 325 statistically based on data from a large number of vehicles 100 transmitted to the server 105. The server 105 can be programmed to transmit the activation surface 310, the first region 320, and the second region 325 to the vehicles 100. The computer 200 can receive the activation surface 310, the first region 320, and the second region 325 from the server 105.

The computer 200 can be programmed to determine a similarity measure between the first values 300 and the second values 305, i.e., between the first values 300 and a most similar set of values from the activation surface 310. For example, the similarity measure can be a shortest distance from the point defined by the first values 300 and the activation surface 310. The distance can be any suitable type of distance for the nature of the variables, e.g., Euclidean, Manhattan, Minkowski, Hamming, etc. The similarity measure may take into account if any of the variables are treated as probabilistic rather than deterministic. The similarity measure may take into account a likely path from the first values 300 to the activation surface 310, i.e., how the variables tend to change over time to reach the activation surface 310 from the first values 300, e.g., whether the path is standard or uncommon, or the length of the path, e.g., treating the space as a vector field to determine the path.

Figure 4:
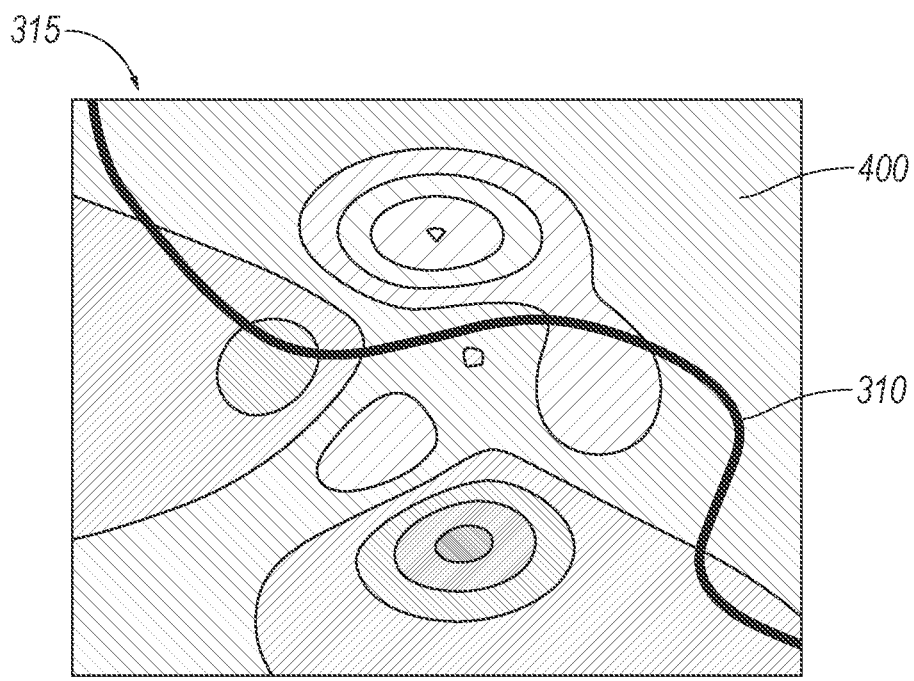
FIG. 4 is a plot of an example first probability distribution of variables of the vehicle.

With reference to FIG. 4, determining whether to transmit the collection of data can be based on a first probability distribution 400 over the variables. The first probability distribution 400, for a given set of values for the variables, can indicate a likelihood of the vehicle 100 being in a situation represented by those values, i.e., can indicate whether the vehicle 100 is in an infrequent situation or a common situation. For example, the first probability distribution 400 can be a probability density function that takes a given set of values of the variables and returns a relative likelihood of the variables equaling those values. FIG. 4 shows the first probability distribution 400 as a topographical plot across the example two-dimensional space 315, with darker shading representing greater relative likelihood.

The server 105 and/or the computer 200 can be programmed to determine the first probability distribution 400. For example, the computer 200 can be programmed to determine the first probability distribution 400 statistically based on the values of the variables recorded over a period of time or distance traveled by the vehicle 100. For another example, the server 105 can be programmed to determine the first probability distribution 400 statistically based on data transmitted to the server 105 by a large number of the vehicles 100, e.g., as a statistical estimate of a true distribution over all the vehicles 100. The server 105 can be programmed to transmit the first probability distribution 400 to the vehicles 100, and the computer 200 on each vehicle 100 can be programmed to receive the first probability distribution 400 from the server 105.

The computer 200 can be programmed to determine a first probability value of the variables equaling the first values 300. For example, the computer 200 can determine the first probability value based on the first probability distribution

400. The first probability value can be what is returned by the first probability distribution 400 when given the first values 300 for the variables. For another example, the computer 200 can determine the first probability value by converting the space 315 to a manifold learning space, e.g., with t-distributed stochastic neighbor embedding, and then measuring cosine similarity, performing clustering analysis, etc. to output the first probability value.

Figure 5:
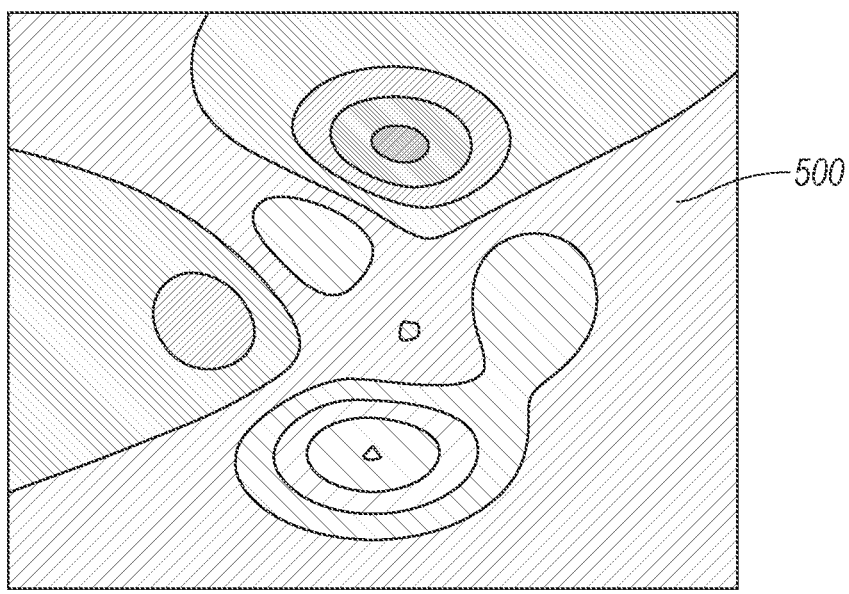
FIG. 5 is a plot of an example second probability distribution of secondary variables of the vehicle.

With reference to FIG. 5, the computer 200 can be programmed to receive a plurality of third values of secondary variables. The secondary variables can be different from the variables used for activating the feature, either directly or as part of a decomposition of the variables used for activating the feature; in other words, it can be the case that none of the secondary variables are included in the variables. For example, the third values can include signals from systems of the vehicle 100 that are not part of the function defining the activation surface but may nevertheless affect performance of the feature. For another example, the third values can include weather data such as temperature, wind speed, visibility, level of cloud cover, etc. For another example, the third values can include road conditions such as road type (highway, surface street, gravel road, etc.), road roughness, traffic density, traffic speed, etc. The computer 200 can receive the third values, e.g., via the transceiver 230.

Determining whether to transmit the collection of data can be based on a second probability distribution 500 over the secondary variables. The second probability distribution 500, for a given set of the third values, can indicate a likelihood of the vehicle 100 being in a situation represented by those values, i.e., can indicate whether the vehicle 100 is in an infrequent situation or a common situation. For example, the second probability distribution 500 can be a probability density function that takes a given set of the third values and returns a relative likelihood of the secondary variables equaling those third values. FIG. 5 shows the second probability distribution 500 as a topographical plot across an example two-dimensional space of the secondary variables, with darker coloring representing greater relative likelihood.

The server 105 and/or the computer 200 can be programmed to determine the second probability distribution 500. For example, the computer 200 can be programmed to determine the second probability distribution 500 statistically based on the third values recorded over a period of time or a distance traveled by the vehicle 100. For another example, the server 105 can be programmed to determine the second probability distribution 500 statistically based on the third values transmitted to the server 105 for a large number of roads. The server 105 can be programmed to transmit the second probability distribution 500 to the vehicles 100, and the computer 200 for each vehicle 100 can be programmed to receive the second probability distribution 500 from the server 105.

The computer 200 can be programmed to determine a second probability value of the secondary variables equaling the third values. For example, the computer 200 can determine the second probability value based on the second probability distribution 500. The second probability value can be what is returned by the second probability distribution 500 when given the third values for the secondary variables. For another example, the computer 200 can determine the second probability value by converting the space defined by the secondary variables to a manifold learning space, e.g., with t-distributed stochastic neighbor embedding, and then measuring cosine similarity, performing clustering analysis, etc. to output the second probability value.

The computer 200 can be programmed to determine whether to transmit a collection of data based on the similarity measure, the first probability value, and/or the second probability value. For example, the computer 200 can determine whether to transmit the collection of data based on a value of a function of the similarity measure, the first probability value, and/or the second probability value, as will be described below. The computer 200 can also determine a temporal range of the collection of data to transmit based on the similarity measure, the first probability value, and/or the second probability, e.g., as beginning when the condition for transmitting becomes true and ending when the condition for transmitting ceases to be true.

The similarity measure, the first probability value, and the second probability value can each affect a likelihood of determining to transmit the collection of data. The likelihood of determining to transmit the collection of data can be positively correlated with the similarity measure, meaning that the collection of data is more likely to be transmitted when the situation is closer to a borderline case for activating the feature. The likelihood of determining to transmit the collection of data is negatively correlated with the first probability value and negatively correlated with the second probability value, meaning that the collection of data is more likely to be transmitted when the situation is unlikely or encountered infrequently by the vehicles 100. By transmitting the probability distributions 400, 500 to the vehicles 100, the server 105 can effectively notify the vehicles 100 of what situations are encountered infrequently over the fleet or group of the vehicles 100 and that are therefore desired for data collection.

The function used to determine whether to transmit the collection of data can be a sum including the similarity measure, the first probability value, and the second probability value. The first probability value and the second probability value can be included in the sum as, e.g., reciprocals or negative values so that the first probability value and the second probability value are negatively correlated with the result of the sum. The sum can be a weighted sum including the similarity measure, the first probability value, and the second probability value weighted by respective weights, e.g., $$\Sigma = \alpha D + \beta p_1 + \gamma p_2$$

in which $\Sigma$ is the result of the sum, D is the similarity measure, $p_1$ is a reciprocal of the first probability value, $p_2$ is the reciprocal of the second probability value, and $\alpha$, $\beta$, and $\gamma$ are the weights. The weights can be chosen based on which type of information is more desired for evaluating the performance of the feature. The server 105 can be programmed to transmit the weights to the vehicles 100, and the computer 200 can be programmed to receive the weights from the server 105, permitting the weights and thereby what data is collected to be dynamically changed.

The computer 200 can determine whether to transmit the collection of data based on whether the sum exceeds a threshold. The threshold can be chosen based on how much data is desired for evaluating the performance of the feature. The server 105 can be programmed to transmit the threshold to the vehicles 100, and the computer 200 can be programmed to receive the threshold from the server 105, permitting what data is collected to be dynamically changed. Transmitting the collection of data to the server 105 can occur upon determining that the sum exceeds the threshold.

The computer 200 can also determine the temporal range of the collection of data to include in the transmission based on whether the sum exceeds the threshold, e.g., the beginning of the collection of data is when the sum begins to exceed the threshold and the end of the collection of data is when the sum ceases exceeding the threshold.

Returning to FIG. 1, the computer 200 can be programmed to, upon determining to transmit the collection of data, transmit the collection of data to the server 105. The collection of data includes a plurality of values of the variables over an interval of time, and those values include the first values 300. For example, the collection of the data can include the data stored in the rolling buffer, meaning that the interval of time is the time to fill the rolling buffer.

Figure 6:
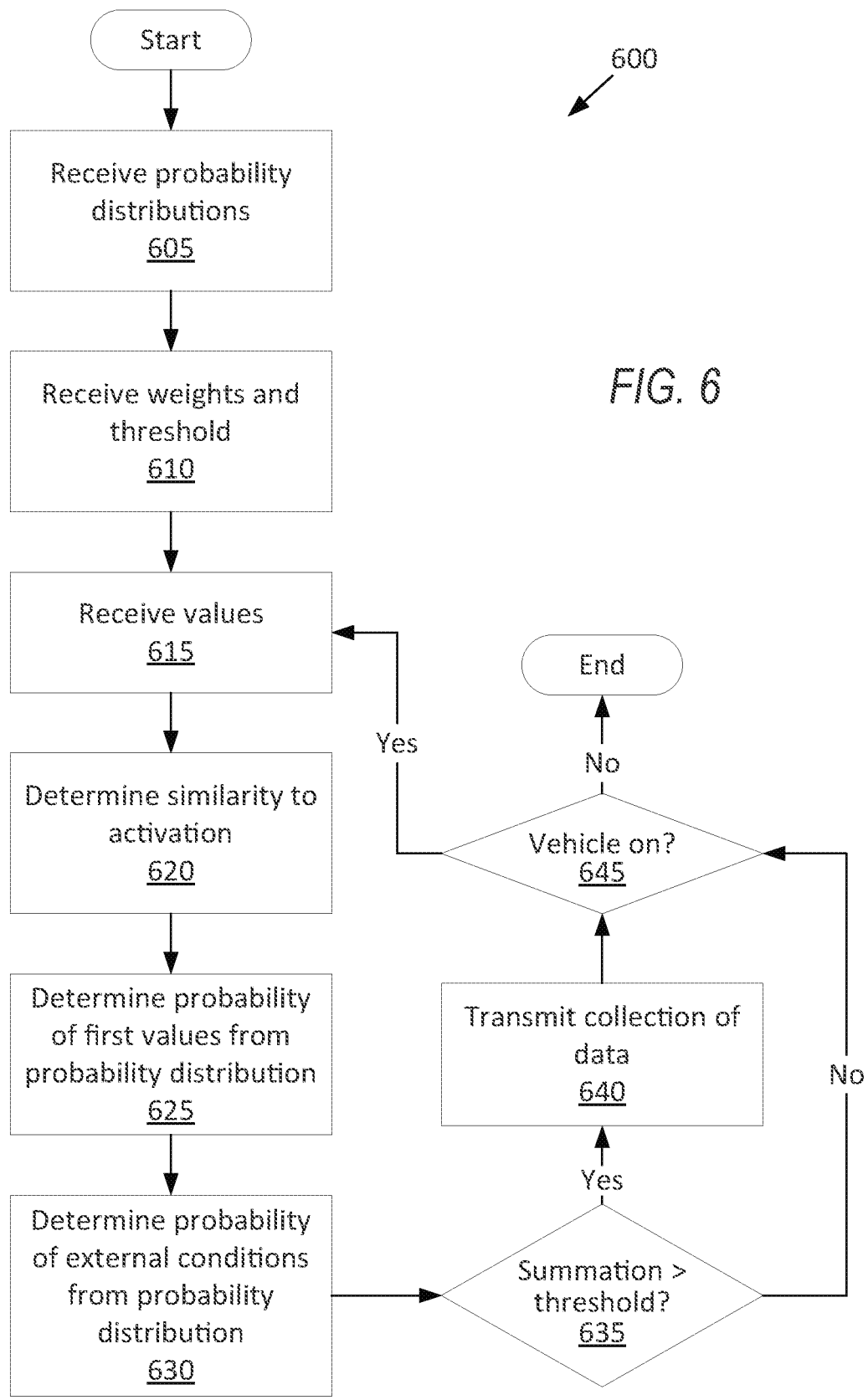
FIG. 6 is a process flow diagram of an example process for transmitting data from the vehicle to a server.

FIG. 6 is a process flow diagram illustrating an exemplary process 600 for transmitting data from the vehicle 100 to a server 105. The memory of the computer 200 stores executable instructions for performing the steps of the process 600 and/or programming can be implemented in structures such as mentioned above. As a general overview of the process 600, the computer 200 can receive the activation surface 310, the first probability distribution 400, the second probability distribution 500, the weights, and the threshold from the server 105. The computer 200 receives the first values 300 over the communications network 205 and determines the similarity measure, the first probability value, and the second probability value. Upon determining that the sum exceeds the threshold, the computer 200 instructs the transceiver 230 to transmit the collection of the data to the server 105. The process 600 typically continues for as long as the vehicle 100 remains on.

The process 600 begins in a block 605, in which the computer 200 receives the activation surface 310, the first probability distribution 400, and the second probability distribution 500 from the server 105 via the transceiver 230.

Next, in a block 610, the computer 200 receives the weights and the threshold from the server 105 via the transceiver 230.

Next, in a block 615, the computer 200 receives the first values 300 of the variables and the third values of the secondary variables, as described above.

Next, in a block 620, the computer 200 determines the similarity measure between the first values 300 and the second values 305 on the activation surface 310, as described above.

Next, in a block 625, the computer 200 determines the first probability value of the variables equaling the first values 300, as described above.

Next, in a block 630, the computer 200 determines the second probability value of the secondary variables equaling the third values, as described above.

Next, in a decision block 635, the computer 200 determines whether to transmit the collection of data by determining whether the sum including the similarity measure, the first probability value, and the second probability value exceeds the threshold, as described above. Upon determining that the sum exceeds the threshold, the process 600 proceeds to a block 640. Upon determining that the sum is less than the threshold, the process 600 proceeds to a decision block 645.

In the block 640, the computer 200 instructs the transceiver 230 to transmit the collection of the data to the server 105, as described above. After the block 640, the process 600 proceeds to the decision block 645.

In the decision block 645, the computer 200 determines whether the vehicle 100 is still on. If so, the process 600 returns to the block 615 to continue receiving the first values 300. If not, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
activate a feature of a vehicle, wherein activation of the feature includes actuation of at least one of a propulsion system, a braking system, or a steering system of the vehicle;
receive a plurality of first values for a respective plurality of variables transmitted over a communications network of the vehicle;
determine a similarity measure between the first values and a plurality of second values of the variables, the second values being a most similar set of values from an activation surface for the feature of the vehicle, the activation surface being a surface in a space defined by the variables dividing the space into a first region and a second region, activation of the feature being more likely than not to have occurred when the variables have values in the first region, and activation of the feature being less likely than not to have occurred when the variables have values in the second region;
determine whether to transmit a collection of data based on the similarity measure, the collection of data being data transmitted over the communications network; and
upon determining to transmit the collection of data, transmit the collection of data to a server remote from the vehicle.

2. The computer of claim 1, wherein a likelihood of determining to transmit the collection of data is positively correlated with the similarity measure.

3. The computer of claim 1, wherein the instructions further include instructions to receive the activation surface from the server.

4. The computer of claim 1, wherein
the instructions further include instructions to determine a probability value of the variables equaling the first values; and
determining whether to transmit the collection of data is based on the probability value.

5. The computer of claim 4, wherein determining the probability value is based on a probability distribution of the variables.

6. The computer of claim 5, wherein the instructions further include instructions to receive the probability distribution of the variables from the server.

7. The computer of claim 4, wherein a likelihood of determining to transmit the collection of data is negatively correlated with the probability value.

8. The computer of claim 4, wherein
the instructions further include instructions to determine a sum including the similarity measure and the probability value;
determining whether to transmit the collection of data includes determining whether the sum exceeds a threshold; and
transmitting the collection of data to the server occurs upon determining that the sum exceeds the threshold.

9. The computer of claim 8, wherein the sum is a weighted sum including the similarity measure and the probability value weighted by respective weights.

10. The computer of claim 9, wherein the instructions further include instructions to receive the weights from the server.

11. The computer of claim 8, wherein
the probability value is a first probability value;
the instructions further include instructions to receive a plurality of third values for a respective plurality of secondary variables, and determine a second probability value of the secondary variables equaling the third values;
the secondary variables are not used for activating the feature; and
the sum includes the similarity measure, the first probability value, and the second probability value.

12. The computer of claim 1, wherein
the instructions further include instructions to receive a plurality of third values for a respective plurality of secondary variables, and determine a probability value of the secondary variables equaling the third values;
the secondary variables are not used for activating the feature; and
determining whether to transmit the collection of data is based on the probability value.

13. The computer of claim 12, wherein determining the probability value is based on a probability distribution of the secondary variables.

14. The computer of claim 13, wherein the instructions further include instructions to receive the probability distribution of the secondary variables from the server.

15. The computer of claim 12, wherein a likelihood of determining to transmit the collection of data is negatively correlated with the probability value.

16. The computer of claim 1, wherein the collection of data includes data indicating whether the feature activated during an interval of time.

17. The computer of claim 1, wherein the collection of data includes a plurality of third values of the variables over an interval of time, and the third values include the first values.

18. The computer of claim 1, wherein the feature is one of forward collision warning, lane-departure warning, blind-spot warning, automatic emergency braking, adaptive cruise control, or lane-keeping assistance.

19. A method comprising:
   activating a feature of a vehicle, wherein activation of the feature includes actuation of at least one of a propulsion system, a braking system, or a steering system of the vehicle;
   receiving a plurality of first values for a respective plurality of variables transmitted over a communications network of the vehicle;
   determining a similarity measure between the first values and a plurality of second values of the variables, the second values being a most similar set of values from an activation surface for the feature of the vehicle, the activation surface being a surface in a space defined by the variables dividing the space into a first region and a second region, activation of the feature being more likely than not to have occurred when the variables have values in the first region, and activation of the feature being less likely than not to have occurred when the variables have values in the second region;
   determining whether to transmit a collection of data based on the similarity measure, the collection of data being data transmitted over the communications network; and
   upon determining to transmit the collection of data, transmitting the collection of data to a server remote from the vehicle.

* * * * *